United States Patent
Olgaard (10) Patent No.: US 9,780,893 B2
(45) Date of Patent: Oct. 3, 2017

(54) METHOD FOR TESTING A RADIO FREQUENCY (RF) DATA PACKET SIGNAL TRANSCEIVER PACKET ERROR RATE

(71) Applicant: LITEPOINT CORPORATION, Sunnyvale, CA (US)

(72) Inventor: Christian Volf Olgaard, Saratoga, CA (US)

(73) Assignee: LitePoint Corporation, Sunnyvale, CA (US)

( * ) Notice: Subject to any disclaimer, the term of this patent is extended or adjusted under 35 U.S.C. 154(b) by 337 days.

(21) Appl. No.: 14/794,138

(22) Filed: Jul. 8, 2015

(65) Prior Publication Data

US 2017/0012715 A1    Jan. 12, 2017

(51) Int. Cl.
*H04B 17/29* (2015.01)
*H04B 17/15* (2015.01)

(52) U.S. Cl.
CPC ............. *H04B 17/29* (2015.01); *H04B 17/15* (2015.01)

(58) Field of Classification Search
CPC ................................ H04B 17/29; H04B 17/15
See application file for complete search history.

(56) References Cited

U.S. PATENT DOCUMENTS

| 2006/0156085 A1 | 7/2006 | Plaumann et al. |
| 2012/0207030 A1 | 8/2012 | Luong |
| 2012/0231745 A1 | 9/2012 | Gregg et al. |
| 2013/0028100 A1* | 1/2013 | Olgaard .................... H04L 1/24 370/242 |
| 2015/0036729 A1* | 2/2015 | Olgaard ............... H04B 17/318 375/224 |

FOREIGN PATENT DOCUMENTS

| JP | 2008-533938 A | 8/2008 |
| JP | 2008-294956 A | 12/2008 |

OTHER PUBLICATIONS

Aug. 31, 2016—(WO) International Search Report and Written Opinion—App PCT/US16/034582.

* cited by examiner

*Primary Examiner* — Chirag Shah
*Assistant Examiner* — Srinivasa Reddivalam
(74) *Attorney, Agent, or Firm* — Banner & Witcoff, Ltd.

(57) ABSTRACT

Method for testing a radio frequency (RF) data packet signal transceiver device under test (DUT) in which test data packets with varying power levels are transmitted to the DUT for testing the DUT while still ensuring that the DUT remains in receive (RX) mode and is prevented from searching for another data packet signal. Alternatively, in the event that the DUT becomes unresponsive due to searching for another data packet signal, multiple test data packets with sufficient signal power levels to ensure reception by the DUT are transmitted to the DUT to cause the DUT to cease searching for another data packet signal and return to RX mode.

8 Claims, 4 Drawing Sheets

FIG. 8

METHOD FOR TESTING A RADIO FREQUENCY (RF) DATA PACKET SIGNAL TRANSCEIVER PACKET ERROR RATE

BACKGROUND

The present invention relates to testing of a radio frequency (RF) data packet signal transceiver, and in particular, to testing a packet error rate (PER) of such a device.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

In such devices, one measure of device receiver performance is packet error rate (PER). The PER is usually expressed as a percentage of the number of packets incorrectly received divided by the total number of packets that were sent and should have been received. When performing non-link testing of wireless devices, where received test data packet signals can be restricted to a single channel, PER testing is not compromised by attempts by the device to find a different wireless access point. However, when performing link testing, the test environment simulates actual operational behavior, including operation by the device where, when the power of the received data packet becomes too low, the device may start to search for a different access point, usually doing so at alternative frequencies or channels.

Hence, during link-based PER testing, where the receive data packet signal power is deliberately made low so as to test worst case performance, it is possible that the DUT may begin searching for a different access point, even as the tester continues to send test data packet signals while counting acknowledgement signals from the DUT (for computation of PER). Accordingly, the tester may interpret, as packet errors, the lack of acknowledgement packets from the DUT during the time that the DUT is searching for another access point, thereby computing a PER test result as being higher than it actually is. This potential problem becomes more significant as the signal power of the test data packets is reduced and approaches the minimum device receiver sensitivity level.

While it may be possible, during link-based PER testing, to prevent the DUT from initiating an access point search, such testing technique would not reflect normal driver operation. Accordingly, this would require modification of the DUT to include special drivers for purposes of PER testing. Therefore, it would be desirable to have a technique by which, from the perspective of the tester, it could be identified when access point searching has begun by the DUT, thereby enabling testing results during this time to be readily identifiable so they can be ignored, thereby allowing correct PER results to be obtained and reflect packet errors only occurring when no access point search is in progress.

SUMMARY

In accordance with the presently claimed invention, a method is provided for testing a radio frequency (RF) data packet signal transceiver device under test (DUT) in which test data packets with varying power levels are transmitted to the DUT for testing the DUT while still ensuring that the DUT remains in receive (RX) mode and is prevented from searching for another data packet signal. Alternatively, in the event that the DUT becomes unresponsive due to searching for another data packet signal, multiple test data packets with sufficient signal power levels to ensure reception by the DUT are transmitted to the DUT to cause the DUT to cease searching for another data packet signal and return to RX mode.

In accordance with one embodiment of the presently claimed invention, a method for testing a radio frequency (RF) data packet signal transceiver device under test (DUT) includes:
  transmitting, from a tester, a tester data packet signal including a plurality of tester data packets with alternating portions having corresponding intervals of mutually higher and lower nominal transmitted tester data packet signal powers as transmitted from the tester;
  receiving, with the tester from a DUT, a DUT data packet signal including a plurality of DUT data packets with alternating portions related to respective ones of the alternating portions of the plurality of tester data packets, thereby defining
    a first ratio of the portion of the plurality of DUT data packets received by the tester and the related portion of the plurality of tester data packets having higher nominal transmitted tester data packet signal powers,
    a second ratio of the portion of the plurality of DUT data packets received by the tester and the related portion of the plurality of tester data packets having lower nominal transmitted tester data packet signal powers, and
    a ratio difference between the first and second ratios;
  repeating the transmitting and receiving of the alternating portions of the pluralities of tester and DUT data packets; and
  maintaining a cumulative count of the plurality of DUT data packets received by the tester and related to the portion of the plurality of tester data packets having lower nominal transmitted tester data packet signal powers during at least one of
    the first ratio equals unity, the first ratio remains substantially constant,
the first ratio is greater than the second ratio, or
the ratio difference is greater than a predetermined value.

In accordance with another embodiment of the presently claimed invention, a method for testing a radio frequency (RF) data packet signal transceiver device under test (DUT) includes:

transmitting, from a tester, a tester data packet signal including a plurality of tester data packets with alternating portions having corresponding intervals of mutually higher and lower nominal transmitted tester data packet signal powers as transmitted from the tester;

receiving, with the tester from a DUT, a DUT data packet signal including a plurality of DUT data packets with alternating portions related to respective ones of the alternating portions of the plurality of tester data packets, thereby defining
  a first ratio of the portion of the plurality of DUT data packets received by the tester and the related portion of the plurality of tester data packets having higher nominal transmitted tester data packet signal powers,
  a second ratio of the portion of the plurality of DUT data packets received by the tester and the related portion of the plurality of tester data packets having lower nominal transmitted tester data packet signal powers, and
  a ratio difference between the first and second ratios;

repeating the transmitting and receiving of the alternating portions of the pluralities of tester and DUT data packets; and maintaining a cumulative count of the plurality of DUT data packets received by the tester and related to the portion of the plurality of tester data packets having lower nominal transmitted tester data packet signal powers until at least one of
  the first ratio becomes less than unity,
  the first ratio becomes less than the second ratio, or
  the ratio difference transcends a predetermined value.

In accordance with another embodiment of the presently claimed invention, a method for testing a radio frequency (RF) data packet signal transceiver device under test (DUT) includes:

transmitting, from a tester, a tester data packet signal including a plurality of tester data packets with alternating portions having corresponding intervals of mutually higher and lower nominal transmitted tester data packet signal powers as transmitted from the tester;

receiving, with the tester from a DUT, a DUT data packet signal including a plurality of DUT data packets with alternating portions related to respective ones of the alternating portions of the plurality of tester data packets, thereby defining
  a first ratio of the portion of the plurality of DUT data packets received by the tester and the related portion of the plurality of tester data packets having higher nominal transmitted tester data packet signal powers,
  a second ratio of the portion of the plurality of DUT data packets received by the tester and the related portion of the plurality of tester data packets having lower nominal transmitted tester data packet signal powers, and
  a ratio difference between the first and second ratios; and repeating the transmitting and receiving of the alternating portions of the pluralities of tester and DUT data packets until at least one of
  the first ratio becomes less than unity,
  the first ratio becomes less than the second ratio, or
  the ratio difference transcends a predetermined value,
  followed by ceasing the transmitting of the portion of the plurality of tester data packets having lower nominal transmitted tester data packet signal powers and repeating the transmitting of the portion of the plurality of tester data packets having higher nominal transmitted tester data packet signal powers.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac, 3GPP LTE, and Bluetooth). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

As discussed in more detail below, there is a power level at which a properly working receiver will reliably return an acknowledgement signal (ACK). During non-link testing, a signal sent at that power level to a DUT receiver will receive an acknowledgement data packet from the DUT. In a link-related test, a signal sent at that power level will also return an acknowledgement packet unless the packet as received by the DUT is defective (e.g., has a CRC error or is not otherwise correctly received) or, due to low test signal level, the DUT has begun a search for a different access point, e.g., at a different frequency.

In accordance with the presently claimed invention, it is this behavior of the DUT that is used to determine when a DUT has begun search for an access point. The tester can determine whether a PER test result is due to actual packet errors or, instead, due to the DUT having initiated an access point search, and, therefore, is not currently engaged in communications with the tester. If an elevated PER is due to initiation of an access point search, the tester is able to ignore questionable errors and thereby improve accuracy of PER test results.

As is well known, testing of a wireless DUT typically includes testing of the DUT receiving and transmitting subsystems. The tester sends a prescribed sequence of test data packet signals to the DUT, using different frequencies, power levels, or signal modulation types, or combinations of two or more of these, to determine whether the DUT receiving subsystem is operating properly. Similarly, the DUT will send DUT data packet signals at a variety of frequencies, power levels, or modulation types, or combinations of two or more of these, to determine if the DUT transmitting subsystem is operating properly.

One method for testing the receiver of a DUT is to send sequences of test data packet signals at different power levels while keeping track of the number of data packets transmitted and the number of successfully received responsive data packets at each power level. For example, if 100 packets are sent at a first power level P1 and 95 packets are correctly received, the packet error rate at power level P1 would be five per 100 (0.05 or 5%).

When a DUT is tested using non-link testing, i.e., sending signals directly to its receiver rather than establishing a prescribed link between test system and DUT, then the number of packet errors can be reliably attributed to a failure of correct data packet reception, since the DUT receiver is programmed to receive data packets only at the specified channel and/or frequency. However, in link-based testing, where the DUT performs essentially as it would under real life conditions, the DUT may begin searching for a different access point when its received signals approach a low power level limit prescribed by the underlying wireless signal standard for the DUT (e.g., IEEE 802.11x and implementation by the DUT of its firmware/MAC layer).

When a tester is sending test data packet signals to a DUT and the DUT is doing an access point search the DUT will not be sending responsive data packets to acknowledge receipt of the tester data packets, since the DUT is typically searching at a different frequency than that at which the intended tester data packets are being transmitted and, therefore, will not respond regardless of the power level(s) of the tester data packets. Under such conditions, the tester would normally count such lack of acknowledgement data packets as packet errors, thereby distorting PER test results.

Figure 1:
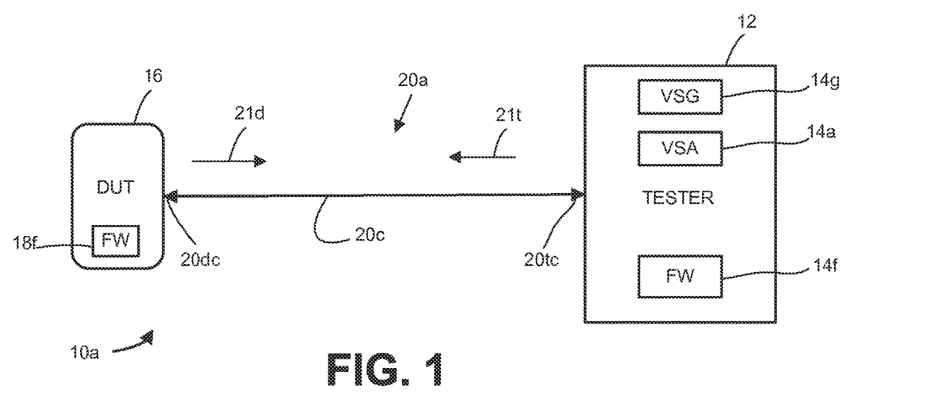
FIG. 1 depicts a typical testing environment for a radio frequency (RF) data packet signal transceiver device under test (DUT) in a conductive, or wired, environment.

Referring to FIG. 1, a typical testing environment 10a includes a tester 12 and a DUT 16, with test data packet signals 21t and DUT data packet signals 21d exchanged as RF signals conveyed between the tester 12 and DUT 16 via a conductive signal path, typically in the form of co-axial RF cable 20c and RF signal connectors 20tc, 20dc. As noted above, the tester typically includes a signal source 14g (e.g., a VSG) to provide the tester data packets for transmission (e.g., modulating and frequency up converting), and a signal analyzer 14a (e.g., a VSA) for receiving (e.g., frequency down converting and demodulating) and analyzing data packets received from the DUT 16 (via the shared RF signal connector 20tc). Also, as discussed above, the tester 12 and DUT 16 include preloaded information regarding predetermined test sequences, typically embodied in firmware 14f within the tester 12 and firmware 18f within the DUT 16. As further noted above, the details within this firmware 14f, 18f about the predetermined test flows typically requires some form of explicit synchronization between the tester 12 and DUT 16, typically via the data packet signals 21t, 21d.

Figure 2:
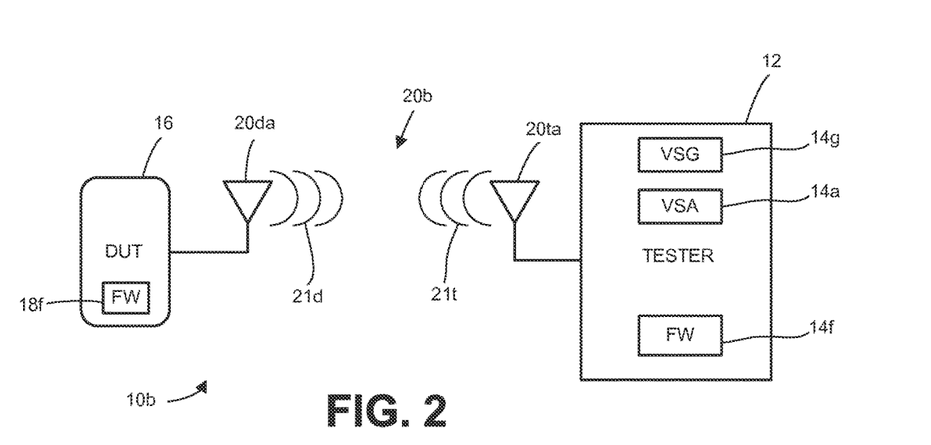
FIG. 2 depicts a typical testing environment for a radio frequency (RF) data packet signal transceiver device under test (DUT) in a radiative, or wireless, environment.

Referring to FIG. 2, Referring to FIG. 2, an alternative testing environment 10b uses a wireless signal path 20b via which the test data packet signals 21t and DUT data packet signals 21d are communicated via respective antenna systems 20ta, 20da of the tester 12 and DUT 16.

Figure 3:
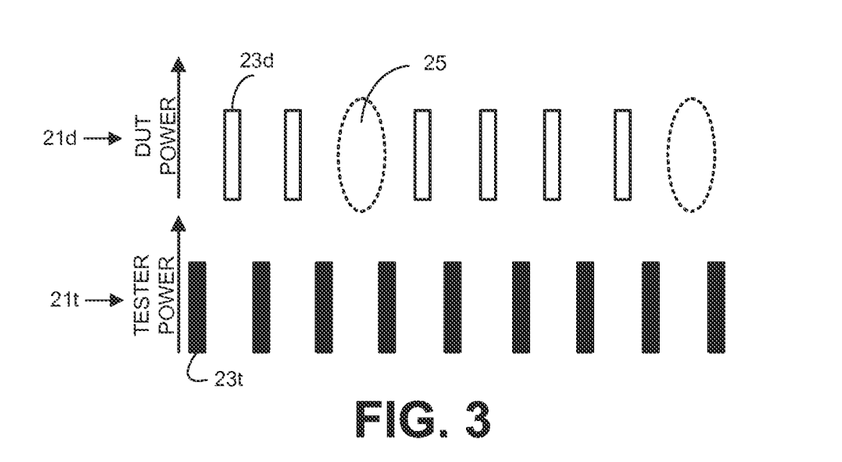
FIG. 3 depicts a PER test during which the DUT does not initiate an AP search.

Referring to FIG. 3, in a typical test (after a link between the tester 12 and DUT 16 has been established), the tester sends a test data packet signal 21t containing test data packets 23t to the DUT. Correct reception of a test data packet 23t by the DUT results in a responsive data packet 23d (e.g., an acknowledgement or ACK packet) transmitted by the DUT as part of its DUT data packet signal 21d. Similarly, the next test data packet results in another responsive data packet. However, the third test data packet results in no receipt of a responsive data packet 25. Similarly, the eighth test data packet also results in no receipt of a responsive data packet. Accordingly, after eight tester data packets have been sent, six have been acknowledged and two have not. These two failures to receive responsive data packets can be reliably considered packet errors, thereby making the PER in this case two out of eight, or 0.25.

Figure 4:
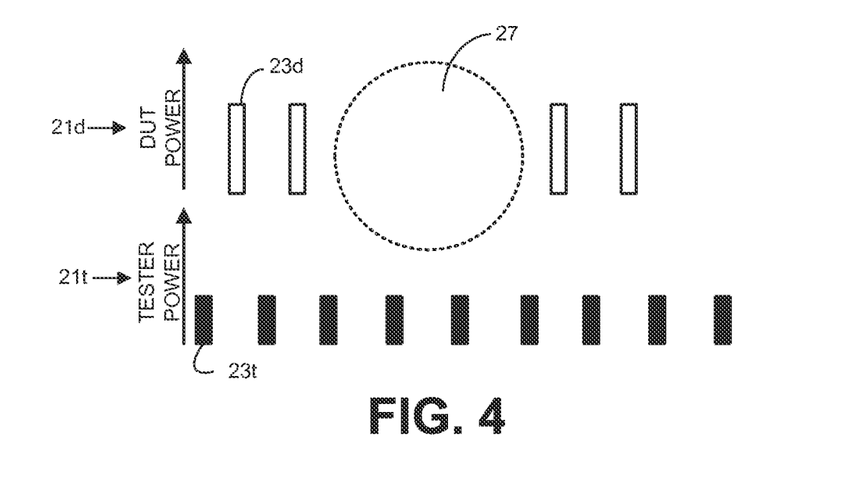
FIG. 4 depicts an example of a PER test where reduced test data packet signal levels may have initiated an AP search by the DUT.

Referring to FIG. 4, the tester data packets 23t are now being transmitted at reduced data packet power levels. As discussed above, this could cause the DUT to initiate a search for another access point. Therefore, the failures of the third, fourth and fifth tester data packets to produce responsive data packets 27 may be due to actual packet errors, or, alternatively, may be due to engagement by the DUT in searching for another access point and, therefore, not receiving or responding to the transmitted tester data packets at reduced power levels. In the event of the tester counting these unacknowledged test data packets as packet errors, when they are actually due to the DUT distraction of searching for another access point, then the resulting PER will appear higher than it actually should be.

Figure 5:
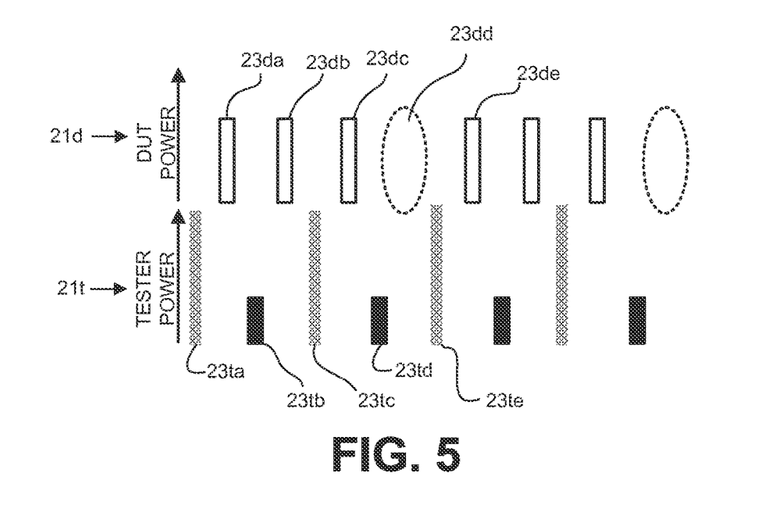
FIG. 5 depicts testing in accordance with one embodiment of the presently claimed invention.

Referring to FIG. 5, in accordance with the presently claimed invention, uncertainties about PER test results due to possible access point searching by the DUT can be avoided. Instead of sending an unbroken sequence of test data packets, alternating sequences of higher powered test data packets 23ta and lower powered test data packets 23tb are transmitted, with confidence that the former should always produce a responsive data packet 23da, while the latter may not. Failure of the higher powered test data packet 23ta to be acknowledged by a responsive data packet 23da would indicate either a defective DUT or a DUT that has initiated an access point search. So long as the higher powered test data packets are acknowledged, any failure to acknowledge a lower powered test data packet can be counted reliably as a packet error. Furthermore, transmitting packets at high power will make a search for a new access point less likely as high power packets are received, thereby producing responsive data packets indicating a good connection.

Accordingly, as shown, a higher powered data packet 23ta produces an acknowledgement data packet 23da. The subsequent lower powered data packet 23tb also produces an acknowledgement data packet 23db. Continuing, the next higher powered data packet 23tc produces an acknowledgement data packet 23dc. Then, however, the next lower powered test data packet 23td fails to produce an acknowledgement data packet 23dd. The next higher powered test data packet 23te does produce an acknowledgement data packet 23de. As a result, it can be reliably concluded that of the two lower powered test data packets 23tb, 23td, one such data packet 23td resulted in a packet error 23dd. Since all of the higher powered test data packets 23ta, 23tc, 23te did produce acknowledgement data packets 23da, 23dc, 23de, it can also be reliably concluded that the DUT was not searching for another access point and was responsive to all test data packets it managed to receive correctly.

Figure 6:
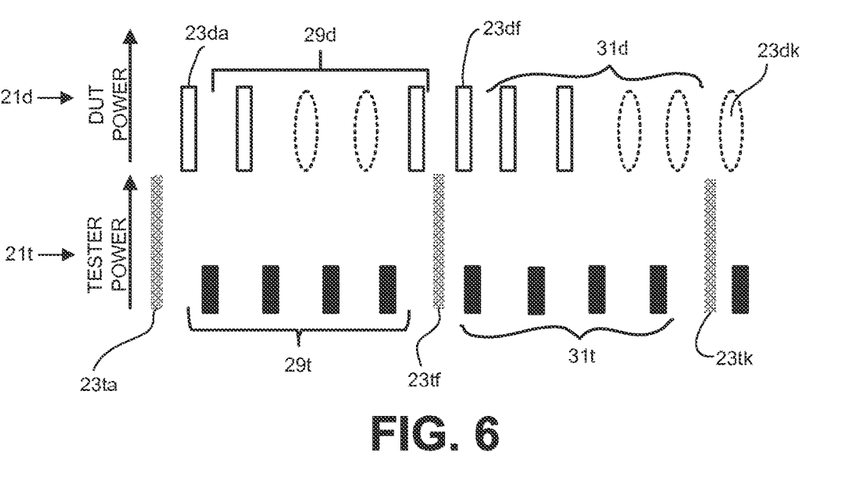
FIG. 6 depicts PER testing in accordance with another embodiment of the presently claimed invention.

Referring to FIG. 6, in accordance with another embodiment of the presently claimed invention, a higher powered test data packet 23ta produces an acknowledgement data packet 23da, and is then followed by a sequence of lower powered test data packets 29t. Of these four lower powered test data packets 29t, two are acknowledged and two are not, thereby producing only two responsive data packets 29d. After this sequence of lower powered test data packets 29t has been transmitted, a higher powered test data packet 23tf is transmitted and acknowledged 23df. This is indicative of the DUT remaining in receive mode (e.g., and not searching for another access point) and the PER test results for the sequence 29t of lower powered test data packets can be relied upon.

Subsequently, another set of four lower powered test data packets 31t are transmitted and produce another responsive data packet sequence 31d in which only partial acknowledgement occurs. Another higher powered test data packet 23tk is then transmitted, but produces no responsive data packet 23dk. This failure to produce a responsive data packet is indicative of the DUT no longer being in receive mode, at least not at the current signal frequency and/or channel but instead possibly being in search of another access point. Accordingly, any PER test results attributable to this partial sequence of responsive data packets 31d may be ignored in its entirety. Alternatively, only the missing responsive data packets may be ignored for purposes of the PER test.

Figure 7:
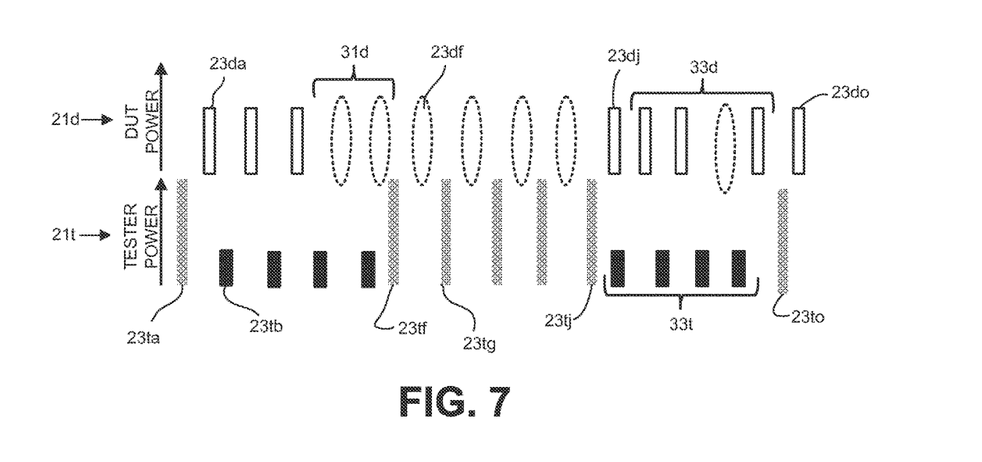
FIG. 7 depicts PER testing in accordance with another embodiment of the presently claimed invention.

Referring to FIG. 7, in accordance with another embodiment of the presently claimed invention, a higher powered test data packet 23ta is transmitted and acknowledged 23da. Then, four lower powered test data packets 23tb are transmitted with two acknowledged and two resulting in no responsive data packets 31d. The subsequent higher powered test data packet 23tf also produces no responsive data packet 23df. Hence, similar to the preceding example, the apparent packet errors indicated by these results may be ignored, since the DUT may have been distracted by searching for another access point. However, after the higher powered test data packet 23tf has been transmitted and produces no responsive data packet 23df, the tester is prompted to repeat sending only higher powered test data packets 23tg until one such data packet 23tj does produce a responsive data packet 23dj. Following receipt of this responsive data packet 23dj, the tester then resumes sending a sequence 33t of lower powered test data packets and maintains a count of responsive data packets 33d received and return. Then, since the subsequent higher powered test data packet 23to produces a responsive data packet 23do, this sequence of lower powered test data packets 33t and the resulting one missing acknowledgement among the responsive data packets 33d are deemed reliable for purposes of the PER test. (As will be readily appreciated, the use of four lower powered test data packets in this example is merely exemplary. Such sequences of lower powered test data packets can include more or fewer packets as desired or needed.)

Figure 8:
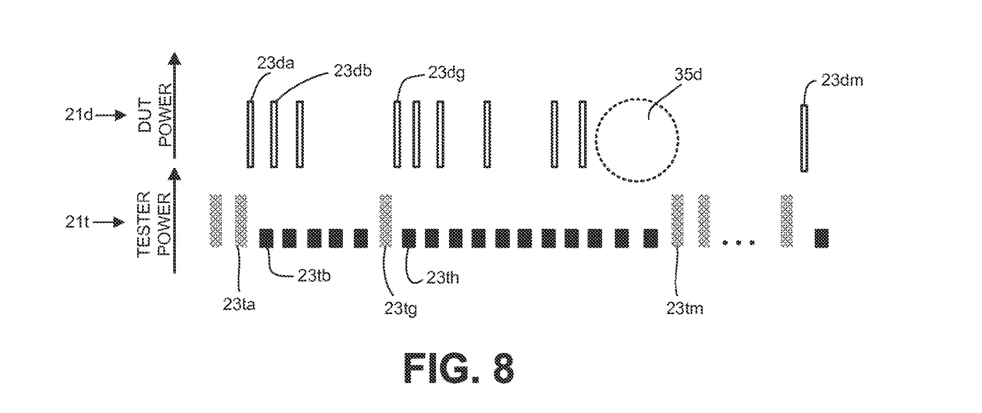
FIG. 8 depicts PER testing in accordance with another embodiment of the presently claimed invention.

Referring to FIG. 8, in accordance with further exemplary embodiments, increased efficiencies may be realized by not transmitting higher powered test data packets 23ta at a predefined or set interval N (e.g., where one out of every N+1 data packets is not used for purposes of PER testing, even if no packet error occurs), but instead, initiating higher powered test data packets based on the number of missing responsive test data packets. For example, as shown here, if three consecutive lower powered test data packets 23tb are not acknowledged, the tester assumes that the DUT may no longer be receiving and, therefore, transmit a higher powered test data packet 23tg which produces a responsive data packet 23dg indicating that the DUT is, in fact, still receiving.

Accordingly, transmission of lower powered test data packets 23th resumes until a new interval 35d during which no responsive data packets are received. Another higher powered test data packet 23tm is then transmitted but produces no responsive data packet, so the tester continues to transmit higher powered test data packets 23tm until a responsive data packet 23dm is finally received. Transmission of higher powered test data packets 23tm not producing responsive data packets, however, should not be of such a duration that the DUT has time to scan for a new access point and still return to the current frequency and/or channel. Such a scenario can be rendered unlikely, however, since the tester controls the frequency of the generated test data packets.

It will be readily appreciated that the power levels of the test data packets need not have the same power level. Further, it may be advantageous to transmit test data packets at a power level expected to produce a PER of 50%, since such power level will typically result in responsive data packets returned for every other test data packet, thereby providing more rapid determination of receiver sensitivity. (Such technique is described in more detail in U.S. patent application Ser. No. 13/959,354, the disclosure of which is incorporated herein by reference.)

Additionally, this method can also be applied to a non-link test to determine if a DUT is suddenly unresponsive. Such method allows the tester to force an early exit from testing when a DUT stops operating (e.g., due to software issues). One benefit realized from this is reduced test time due to the early test exit instead of waiting for the full test run or a time out condition.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a radio frequency (RF) data packet signal transceiver device under test (DUT), comprising:
   transmitting, from a tester, a tester data packet signal including a plurality of tester data packets with alternating portions having corresponding intervals of mutually higher and lower nominal transmitted tester data packet signal powers as transmitted from said tester;
   receiving, with said tester from a DUT, a DUT data packet signal including a plurality of DUT data packets with alternating portions related to respective ones of said alternating portions of said plurality of tester data packets, thereby defining
      a first ratio of said portion of said plurality of DUT data packets received by said tester and said related portion of said plurality of tester data packets having higher nominal transmitted tester data packet signal powers,
      a second ratio of said portion of said plurality of DUT data packets received by said tester and said related portion of said plurality of tester data packets having lower nominal transmitted tester data packet signal powers, and
      a ratio difference between said first and second ratios;
   repeating said transmitting and receiving of said alternating portions of said pluralities of tester and DUT data packets; and
   maintaining a cumulative count of said plurality of DUT data packets received by said tester and related to said portion of said plurality of tester data packets having lower nominal transmitted tester data packet signal powers during at least one of
      said first ratio equals unity,
      said first ratio remains substantially constant,
      said first ratio is greater than said second ratio, or
      said ratio difference is greater than a predetermined value.

2. The method of claim 1, wherein said transmitting and receiving of said tester and DUT data packet signals comprise transmitting and receiving said tester and DUT data packet signals via a wireless signal path.

3. A method for testing a radio frequency (RF) data packet signal transceiver device under test (DUT), comprising:
   transmitting, from a tester, a tester data packet signal including a plurality of tester data packets with alternating portions having corresponding intervals of mutually higher and lower nominal transmitted tester data packet signal powers as transmitted from said tester;
   receiving, with said tester from a DUT, a DUT data packet signal including a plurality of DUT data packets with alternating portions related to respective ones of said alternating portions of said plurality of tester data packets, thereby defining
      a first ratio of said portion of said plurality of DUT data packets received by said tester and said related portion of said plurality of tester data packets having higher nominal transmitted tester data packet signal powers,
      a second ratio of said portion of said plurality of DUT data packets received by said tester and said related portion of said plurality of tester data packets having lower nominal transmitted tester data packet signal powers, and
      a ratio difference between said first and second ratios;
   repeating said transmitting and receiving of said alternating portions of said pluralities of tester and DUT data packets; and
   maintaining a cumulative count of said plurality of DUT data packets received by said tester and related to said portion of said plurality of tester data packets having lower nominal transmitted tester data packet signal powers until at least one of
      said first ratio becomes less than unity,
      said first ratio becomes less than said second ratio, or
      said ratio difference transcends a predetermined value.

4. The method of claim 3, wherein said transmitting and receiving of said tester and DUT data packet signals comprise transmitting and receiving said tester and DUT data packet signals via a wireless signal path.

5. A method for testing a radio frequency (RF) data packet signal transceiver device under test (DUT), comprising:
   transmitting, from a tester, a tester data packet signal including a plurality of tester data packets with alternating portions having corresponding intervals of mutually higher and lower nominal transmitted tester data packet signal powers as transmitted from said tester;
   receiving, with said tester from a DUT, a DUT data packet signal including a plurality of DUT data packets with alternating portions related to respective ones of said alternating portions of said plurality of tester data packets, thereby defining
      a first ratio of said portion of said plurality of DUT data packets received by said tester and said related portion of said plurality of tester data packets having higher nominal transmitted tester data packet signal powers,
      a second ratio of said portion of said plurality of DUT data packets received by said tester and said related portion of said plurality of tester data packets having lower nominal transmitted tester data packet signal powers, and
      a ratio difference between said first and second ratios; and
   repeating said transmitting and receiving of said alternating portions of said pluralities of tester and DUT data packets until at least one of said first ratio becomes less than unity,
said first ratio becomes less than said second ratio, or
said ratio difference transcends a predetermined value,
followed by ceasing said transmitting of said portion of said plurality of tester data packets having lower nominal transmitted tester data packet signal powers and repeating said transmitting of said portion of said plurality of tester data packets having higher nominal transmitted tester data packet signal powers.

6. The method of claim 5, wherein said repeating said transmitting of said portion of said plurality of tester data packets having higher nominal transmitted tester data packet signal powers comprises repeating said transmitting of said portion of said plurality of tester data packets having higher nominal transmitted tester data packet signal powers until one or more DUT data packets are received by said tester.

7. The method of claim 5, wherein said repeating said transmitting of said portion of said plurality of tester data packets having higher nominal transmitted tester data packet signal powers comprises repeating said transmitting of said portion of said plurality of tester data packets having higher nominal transmitted tester data packet signal powers until one or more DUT data packets are received by said tester followed by resuming said repeating said transmitting and receiving of said alternating portions of said pluralities of tester and DUT data packets.

8. The method of claim 5, wherein said transmitting and receiving of said tester and DUT data packet signals comprise transmitting and receiving said tester and DUT data packet signals via a wireless signal path.

\* \* \* \* \*